United States Patent
Lockwood et al.

(10) Patent No.: US 11,072,903 B2
(45) Date of Patent: Jul. 27, 2021

(54) EQUIPMENT TOWER HAVING A CONCRETE PLINTH

(71) Applicants: Siemens Gamesa Renewable Energy, Inc., Orlando, FL (US); Wind Tower Technologies, LLC, Boulder, CO (US)

(72) Inventors: James D. Lockwood, Boulder, CO (US); Matthew J. Chase, Windsor, CO (US); Luis E. Carbonell, Deltona, FL (US)

(73) Assignees: SIEMENS GAMESA RENEWABLE ENERGY, INC., Orlando, FL (US); WIND TOWER TECHNOLOGIES, LLC, Boulder, CO (US)

(*) Notice: Subject to any disclaimer, the term of this patent is extended or adjusted under 35 U.S.C. 154(b) by 46 days.

(21) Appl. No.: 15/753,193

(22) PCT Filed: Aug. 3, 2016

(86) PCT No.: PCT/US2016/045223
§ 371 (c)(1),
(2) Date: Feb. 16, 2018

(87) PCT Pub. No.: WO2017/039923
PCT Pub. Date: Mar. 9, 2017

(65) Prior Publication Data
US 2019/0010673 A1    Jan. 10, 2019

Related U.S. Application Data

(60) Provisional application No. 62/211,991, filed on Aug. 31, 2015, provisional application No. 62/211,998, filed on Aug. 31, 2015.

(51) Int. Cl.
*E02D 27/00*    (2006.01)
*E02D 27/42*    (2006.01)
*F03D 13/20*    (2016.01)

(52) U.S. Cl.
CPC .......... *E02D 27/425* (2013.01); *F03D 13/22* (2016.05); *Y02E 10/728* (2013.01)

(58) Field of Classification Search
CPC ....... E02D 27/425; F03D 13/22; F03D 13/20; Y02E 10/728; E04H 12/00; E04H 12/003; E04H 12/16
(Continued)

(56) References Cited

U.S. PATENT DOCUMENTS 7,752,825 B2 * 7/2010 Wobben ............... E04C 3/22
                                                         52/848
8,037,646 B2 * 10/2011 Wobben ............. E02D 27/42
                                                         405/243

(Continued)

FOREIGN PATENT DOCUMENTS

CL    2015000263 A1    7/2015
CN    102720207 A    10/2012
(Continued)

OTHER PUBLICATIONS

PCT International Search Report and Written Opinion of International Searching Authority dated Mar. 29, 2017 corresponding to PCT International Application No. PCT/US2016/045223 filed Aug. 3, 2016.
(Continued)

*Primary Examiner* — Brian E Glessner
*Assistant Examiner* — James J Buckle, Jr.
(74) *Attorney, Agent, or Firm* — Schmeiser, Olsen & Watts LLP

(57) ABSTRACT

An equipment tower includes a foundation, a cast-in-place concrete plinth extending vertically from the foundation, and a tower portion extending vertically from the plinth. The equipment tower is constructed at a site having a set of tower specific parameters, and at least one dimension of the plinth
(Continued)

is selected based on a tower specific parameter. For example, a height of the plinth may be selected to achieve a desired elevation of the topmost surface of the plinth, so that two towers having identical tower segments will have a common equipment height in spite of variations in their respective foundation elevations due to variations in local ground level. Moreover, the cast-in-place plinth may be designed to include a door opening large enough to accommodate equipment to be installed within the tower.

8 Claims, 3 Drawing Sheets

(58) Field of Classification Search
USPC .......................................................... 52/297
See application file for complete search history.

(56) References Cited

U.S. PATENT DOCUMENTS

| | | | |
|---|---|---|---|
| 8,051,627 B2* | 11/2011 | Schiffer | E02D 27/42 |
| | | | 52/296 |
| 8,250,833 B2 | 8/2012 | Thomsen | |
| 8,261,502 B2* | 9/2012 | Andersen | E02D 27/42 |
| | | | 52/296 |
| 8,484,905 B2* | 7/2013 | Skjaerbaek | E04C 5/125 |
| | | | 52/40 |
| 8,801,331 B2* | 8/2014 | Perner | E02D 27/42 |
| | | | 405/204 |
| 9,175,491 B2* | 11/2015 | Gawrisch | E04H 12/003 |
| 9,175,670 B2* | 11/2015 | Lockwood | E04H 12/16 |
| 9,206,617 B2* | 12/2015 | Wobben | E02D 27/42 |
| 9,670,909 B2* | 6/2017 | Holscher | F03D 13/22 |
| 9,869,300 B2* | 1/2018 | Martinez De Castaneda | |
| | | | E02D 27/42 |
| 2002/0124502 A1* | 9/2002 | Henderson | E02D 27/42 |
| | | | 52/296 |
| 2007/0006541 A1* | 1/2007 | Seidel | E02D 27/42 |
| | | | 52/292 |
| 2008/0313927 A1 | 12/2008 | Conforti et al. | |
| 2008/0313972 A1* | 12/2008 | Grob | E01D 19/02 |
| | | | 52/40 |
| 2009/0212575 A1* | 8/2009 | Larsen | F03D 80/40 |
| | | | 290/55 |
| 2010/0008776 A1* | 1/2010 | Larsen | F03D 9/00 |
| | | | 416/39 |
| 2010/0043318 A1* | 2/2010 | Armbrecht | F03D 13/22 |
| | | | 52/173.1 |
| 2010/0095617 A1* | 4/2010 | Scholte-Wassink | F03D 80/00 |
| | | | 52/296 |
| 2010/0325986 A1* | 12/2010 | Garc A Maestre | E04H 12/085 |
| | | | 52/223.3 |
| 2011/0278850 A1* | 11/2011 | Murata | E02D 27/42 |
| | | | 290/55 |
| 2012/0159875 A1* | 6/2012 | Meyer | E04H 12/182 |
| | | | 52/115 |
| 2014/0033628 A1 | 2/2014 | Lockwood | |
| 2014/0318033 A1 | 10/2014 | Coordes | |
| 2015/0225918 A1* | 8/2015 | Phuly | E02D 27/42 |
| | | | 52/297 |
| 2017/0089090 A1* | 3/2017 | D Ez Cornejo | E04H 12/341 |
| 2018/0023548 A1* | 1/2018 | Ollgaard | F03D 13/20 |
| | | | 290/44 |
| 2018/0030750 A1* | 2/2018 | Ollgaard | E06B 1/6046 |

FOREIGN PATENT DOCUMENTS

| | | |
|---|---|---|
| CN | 101328864 B | 4/2013 |
| CN | 103821677 A | 5/2014 |
| EP | 2390421 A2 | 11/2011 |
| EP | 2728179 A1 | 5/2014 |
| WO | 2015051926 A1 | 4/2015 |

OTHER PUBLICATIONS

Canadian Office Action dated May 27, 2020 for Application No. 2,997,924.

* cited by examiner

EQUIPMENT TOWER HAVING A CONCRETE PLINTH

This application claims benefit of the 31 Aug. 2015 filing date of U.S. provisional patent application Nos. 62/211,991 and 62/211,998, both of which are incorporated by reference herein in their entireties.

FIELD OF THE INVENTION

This invention relates generally to the field of equipment towers, and more particularly, to an equipment tower having a cast-in-place plinth.

BACKGROUND OF THE INVENTION

Existing methods of constructing towers used to support different types of equipment, such as lighting, antennae, cellular telephone equipment or wind turbine equipment, or to function as a chimney, vary depending on whether the tower materials are steel or concrete. The decision process used to select whether the tower is to be built out of steel or concrete may depend upon the geographic location, regional resources, height and weight bearing requirements for the tower, and access to the site for constructing the tower. Steel towers are commonly built by bolting steel tubular sections together at intermediate flanges. Generally, as the height of a tower increases, the diameter of the tower at its base increases in order to accommodate the higher loads generated by the taller tower. The heights of steel towers are often limited by the diameter of the steel tubular sections that can be physically transported to the construction site without significant modifications to existing roads, bridges, or other right of way constraints. These limitations typically result in steel tower pieces having diameters of up to approximately 20.0 feet. As a result of these diameter limitations, the overall tower height is limited when using conventional strength steel. Energy production from a wind turbine mounted on a tower generally goes up by increasing the height of the tower. Thus, the transportation constraints for steel towers can limit the productivity of a wind turbine when the tower is made of steel.

Concrete towers can be fabricated at or near the tower location when the materials of construction are locally available. Cast-in-place construction methods allow for pouring concrete into forms erected at the tower location. Drawbacks to cast-in-place methods include reduced construction speed and sensitivity to inclement weather. Also, the shape of a typical concrete wind tower is tapered, which creates complexity in the concrete pouring process. Alternatively, concrete tower sections can be fabricated locally and erected to form the tower. Because the concrete tower sections are not transported over long distances, the transportation constraints involved with transporting steel sections are avoided.

U.S. Pat. No. 9,175,670 B2 issued on Nov. 3, 2015, to Lockwood, et al. describes a post-tensioned precast concrete tower formed by stacking precast concrete annular segments on a foundation, wherein the diameter of the segments varies in stages over the height of the tower. This tower geometry simplifies the formwork used to precast the segments Equipment towers are highly engineered structures designed to carry specific loads including deadweight, wind, seismic and thermal loadings. Generally, a specific tower design is qualified for an envelope of such loadings so that one tower design may be used for a plurality of locations having conditions within that envelope. Site-specific conditions are generally accommodated within a generic tower design in order to avoid the cost of designing a specific tower for each specific location.

BRIEF DESCRIPTION OF THE DRAWINGS

The invention is explained in the following description in view of the drawings that show.

DETAILED DESCRIPTION OF THE INVENTION

The present inventors have recognized limitations associated with known equipment tower design techniques. For example, while the use of standard tower designs has the advantage of avoiding tower-specific design qualification, it has the disadvantage of being unable to accommodate minor tower-specific variations, notably minor height changes due to local ground elevation variations. In a typical equipment tower farm such as a wind farm, there may be several to dozens of wind turbine towers installed in relatively close proximity on a plot of land owned or leased by a power production company. Wind turbine designs are optimized for a target elevation based upon a model of the wind velocities at a particular site. It is common to use a standardized tower design for all towers of a wind farm in order to minimize design cost and construction complexity. However, this practice does not account for ground elevation variations across the site, and it results in the hub height of the various wind turbines of the wind farm varying directly in response to the local ground level elevation, thereby potentially adversely affecting the efficiency of the wind farm operation. The present invention provides a solution to this problem without necessitating tower-specific designs by incorporating a cast-in-place pedestal or plinth disposed between the foundation and pre-cast tower segments, wherein the height of the plinth is responsive to the local ground elevation to achieve a predetermined hub height for each respective wind turbine of the wind farm.

Figure 1:
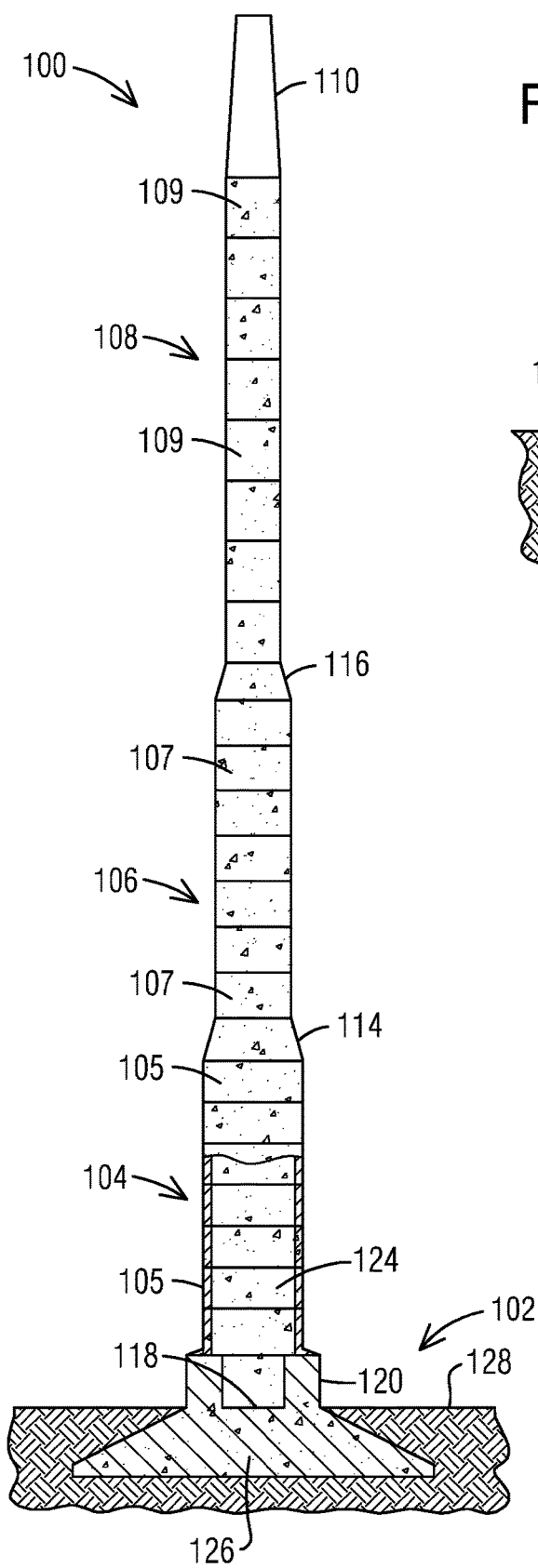
FIG. 1 illustrates an exemplary equipment tower showing a cut-away lower section of the tower.

FIG. 1 illustrates a cross-section of an exemplary equipment tower 100 that may be, for example, a wind turbine tower, a cell tower or any other tower upon which various types of equipment may be supported. Such equipment may be affixed at or proximate the top of the equipment tower 100 or affixed at desired locations along the length of the equipment tower 100 depending on a particular application. Tower 100 may include a foundation 102, a bottom tower portion 104, a middle tower portion 106, a top tower portion 108 and a steel tip adapter 110. Each tower portion 104, 106, 108 may be formed with a plurality of tower segments 105, 107, 109, respectively, that may be formed of precast concrete. Each tower segment 105 may have a first constant diameter and a first height, each tower segment 107 may have a second constant diameter and a second height and each tower segment 109 may have a third constant diameter and a third height. As illustrated in FIG. 1, the first constant diameter of tower segments 105 may be greater than the second constant diameter of tower segments 107, which in turn are greater than the third constant diameter of tower segments 109 thereby forming an equipment tower 100 that decreases in diameter from the bottom tower portion 104 to the top tower portion 108. Transition segments 114 and 116 may be positioned between appropriate tower portions 104, 106, 108 to accommodate the progressive step down in the diameter of tower segments 105, 107, 109 from the bottom to the top of equipment tower 100.

The number of tower segments 105, 107, 109 to be used in each tower portion 104, 106, 108, respectively, may vary from one tower to another but it is typically conventional to construct an exemplary equipment tower 100 using a standard number of tower segments 105, 107, 109. Using a standard number of segments creates a fixed height for each tower portion 104, 106, 108, which creates cost efficiencies when constructing multiple equipment towers 100 but does not allow for the overall height of equipment tower 100 to be modified in a cost effective manner.

With continuing reference to FIG. 1, a steel tip adapter 110 may connect to the topmost concrete annular tower segment of the equipment tower 100. The steel tip adapter 110 may be used to support the nacelle of a wind turbine (not shown).

Tower segments 105, 107, 109 may be precast concrete each having constant diameters and heights. Tower segments 105, 107, 109 may also be match cast together to achieve a precision fit between adjacent sections. Such match cast joints may incorporate a shear key configuration used to transfer shear across the segment joints under transverse loads to the equipment tower 100 and to assist with aligning segments with each other during construction, as described in U.S. Pat. No. 9,175,670 B2 discussed above. In some instances, epoxy may be applied onto a segment joint prior to closing the gap between two segments. The epoxy may lubricate the annular face of the segments when placing sections on top of one another, then seal the joint after the epoxy cures. Further, grout may be used to secure tower segments 105, 107, 109 together depending on site specific parameters.

FIG. 1 further illustrates foundation 102 that may include a platform 118 and a subsection 126. A pedestal or plinth 120 extends from platform 118 and has an inside surface that defines an internal chamber 124. Subsection 126 may be tapered and may extend from platform 118 so it is located below ground level 128. In the construction of equipment tower 100, a base of the tapered subsection 126 may be round, square, polygonal or other appropriate shapes depending on site specific parameters. The top portion of subsection 126 may be rounded or formed with a plurality of contiguous flat surfaces as the site specific parameters require. Foundation 120 may be cast-in-place, then back filled with dirt to cover its top surface. Plinth 120 may extend upwardly from platform 118 to variable dimensions as will be described in more detail hereinafter.

In exemplary embodiments of the invention, plinth 120 may be cast at the same time that foundation 102 is cast, in which case plinth 120 may be integrally formed with platform 118. In alternate embodiments, plinth 120 may be cast-in-place at a time after the platform 118 and tapered subsection 126 are cast, with plinth 120 optionally being mechanically coupled or connected to platform 118. In either approach, the cast-in-place dimensions of plinth 120 may be varied as a function of site specific parameters.

Figure 2:
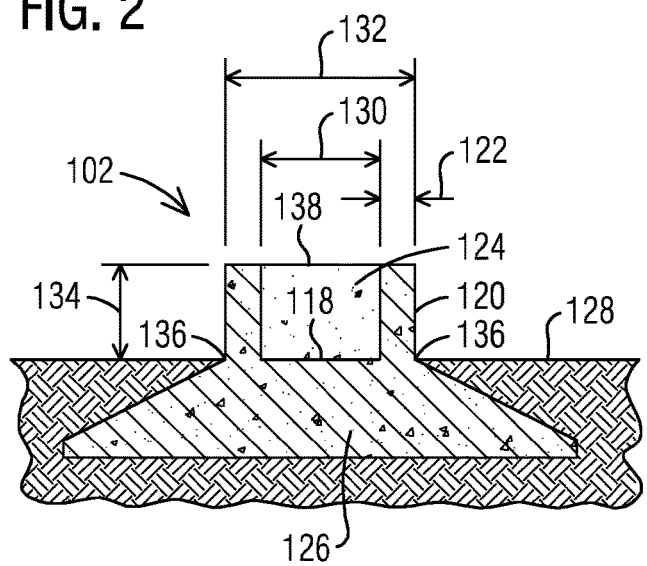
FIG. 2 illustrates a cross-sectional, enlarged view of the foundation and cast-in-place plinth of the tower of FIG. 1.

FIG. 2 illustrates foundation 102 and plinth 120 of FIG. 1 prior to setting of the concrete tower sections 104, 106, 108. Plinth 120 is illustrated as cast-in-place and extending from platform 118. Plinth 120 may be formed as an annular wall, for example, having a set of dimensions that may vary from tower to tower as a function of tower specific parameters. The set of plinth 120 dimensions may include an inside diameter 130, an outside diameter 132, and a height 134, which may be measured from an upper or top surface of platform 118 to the upper or top surface of plinth 120. The difference between the outside diameter 132 and inside diameter 130 of plinth 120 may be referred to herein as a wall thickness 122 of plinth 120.

The set of dimensions forming plinth 120 may be a function of tower specific parameters, which may include, but are not limited to, the height and weight of equipment tower 100, the inside or outside diameter of the bottommost tower segment 105, and topographical features of the site such as varying elevations from the placement of one equipment tower 100 to the placement of another, such as with a wind farm having a plurality of equipment towers 100. In this manner, a tower-specific plinth design may be determined to accommodate tower-specific variables, such as minor ground elevation changes, without the need to re-engineer the entire tower 100.

Exemplary embodiments of the present invention for typical wind turbine towers may have a wall thickness 122 of plinth 120 of between about 0.5 feet and 3.0 feet, or between about 1.0 foot and 2.0 feet depending on one or more of the site specific parameters. Plinth 120 may be formed with the wall thickness 122 being constant across its height 134, in which case plinth 120 forms a substantially annular ring having constant inside and outside diameters 130, 132. Alternate embodiments allow for the wall thickness to vary across the height 134 of plinth 120 by varying one or both of the inside and outside diameters 130, 132, in which case the wall thickness is tapered. For example, inside diameter 130 may be held constant with outside diameter 132 increasing from the top of plinth 120 to its bottom so that the outside surface of plinth 120 is tapered from top to bottom, which may be desirable for additional buttressing of the weight of equipment tower 100. Alternate embodiments allow for the inside and outside diameters 130, 132 to be adjusted as a function of site or tower specific parameters.

Exemplary embodiments of the invention for typical wind turbine towers allow for the height 134 of plinth 120 to be between about 7.0 feet and 20.0 feet, or between about 10.0 feet and 15.0 feet. Other heights 134 of plinth 120 may be selected in accordance with aspects of the present invention based on site specific parameters such as ensuring plinth 120 has a sufficient height 134 to accommodate a door opening formed therein, or that equipment tower 100 is constructed to a desired equipment elevation, or that multiple equipment towers 100 are constructed to a uniform desired equipment elevation taking into account site topography.

Referring again to FIG. 2, plinth 120 is shown with its wall thickness 122 being formed on the periphery 136 of platform 118, in which case the entire exposed surface of platform 118 is located within internal chamber 124 as delineated by the inside diameter 130 of plinth 120. In alternate embodiments, inside diameter 130 may be moved radially inwardly toward the center of platform 118 with or without outside diameter 132 being moved a proportionate or disproportionate distance. For example, the outside diameter 132 of plinth 120 may remain proximate the periphery 136 of platform 118 with the inside diameter 130 of plinth 120 moved radially inwardly to vary the wall thickness of plinth 120. The outside diameter 130 may also be moved radially inwardly thereby exposing a portion of platform 118 outside plinth 120. Thus, the position of plinth 120 on platform 118 and its wall thickness may be independently varied by controlling the inside and outside diameters 130, 132 as a function of tower specific parameters.

Casting plinth 120 in place can achieve significant cost reductions compared to forming and shipping plinth 120 from a remote location. Moreover, tower-specific variations in the elevation of platform 118 can be accommodated in the formwork used to cast plinth 120 to achieve a desired elevation of the topmost surface 138 of the plinth 120, thereby ensuring that a desired hub height is achieved for each tower 100 using a standardized tower design. While embodiments of the invention cast plinth 120 in place either simultaneously with foundation 120 or shortly thereafter, it should be recognized that plinth 120 may be cast proximate the tower site and then moved into place provided that the desired tower-specific dimensions of plinth 120 are attained within acceptable tolerances.

A further advantage of a tower specific cast-in-place plinth 120 is that a large door opening may be incorporated into the plinth design. Door openings are provided in equipment towers to accommodate personnel and equipment access into the central volume of the tower. The size of such door openings is usually limited because the opening creates a stress concentration which weakens the wall of the tower. For wind turbine towers, the size of the door opening is often smaller than the size of equipment that is positioned within the base of the tower. As a result, such equipment must be positioned on the platform before the tower sections are erected, or the equipment may be lifted by crane and lowered into the tower volume after at least some of the tower sections are erected. With either technique, the equipment is at risk of damage during the tower erection process.

Figure 3:
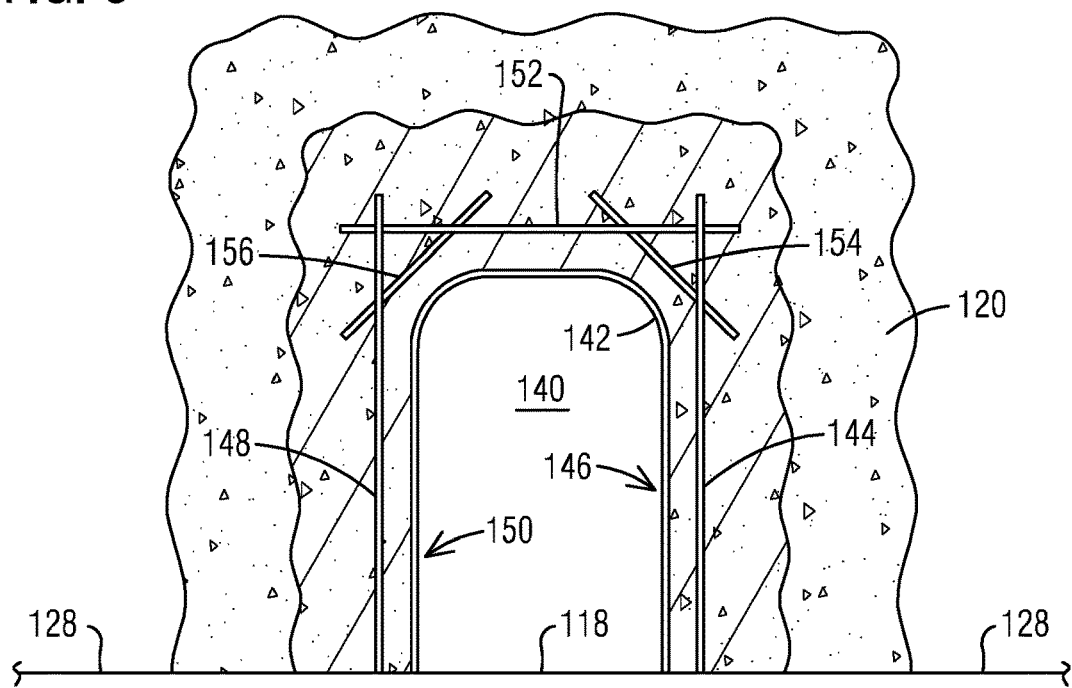
FIG. 3 illustrates an exemplary door opening formed within the plinth of FIG. 2 with a cut-away view of steel reinforcement surrounding the door opening.

An advantage of embodiments of the present invention is that the plinth 120 may be sized so that a door opening may be formed within plinth 120 for allowing tower equipment to be moved into internal chamber 124 at any time after the construction of equipment tower 100. Referring to FIG. 3, a door opening 140 is illustrated as being formed within plinth 120, which has a wall thickness 122 defined by inside and outside diameters 130, 132, as shown in FIG. 2 that is sufficient to support the load of equipment tower 100 even with door opening 140 formed therein. In this manner, the stress concentration created by door opening 140 is accommodated by increasing the wall thickness 122, thereby allowing door opening 140 to be sufficiently large to allow equipment, such as a power unit for a wind turbine, to be moved into internal chamber 124 at any time during or after the construction of equipment tower 100.

In this respect, plinth 120 is made of cast-in-place concrete having a set of dimensions exhibiting sufficient strength to distribute the load from the weight of an equipment tower 100. In conventional wind turbine towers that are made of steel, the steel walls that make up the tower are typically just a few inches thick. A steel tower of just a few inches cannot accommodate a large door opening. Similarly, precast concrete tower sections 105 have relatively limited thicknesses and can accommodate only relatively small door openings. However, the wall of plinth 120 is formed of reinforced concrete and can be made as thick as desired to support the loads of the tower 100 even though there is a relatively large door opening 140 defined in the plinth 120. Thus, equipment does not have to be lowered into the internal chamber 124 of an equipment tower 100 with a crane during the early part of the construction process. This allows for greater flexibility in scheduling the delivery of equipment to a construction site and can remove the equipment delivery from the critical path. Moreover, because the equipment does not have to be moved into the tower prior to completion of the tower erection, the risk of damage to the equipment is reduced.

FIG. 3 also illustrates a door frame 142 that may be formed in place when plinth 120 is cast-in-place. Door opening 140 and door frame 142 are shown as being shaped essentially as an arch; however, other shapes may be used provided that the plinth 120 retain sufficient strength to support the equipment tower 100. For example, in alternate embodiments, door opening and frame 140, 142 may be substantially rectangular, or formed with two opposed generally vertical side members, a generally horizontal top member and an oblique member interconnecting each end of the top member to a top of a respective side member.

Figure 4:
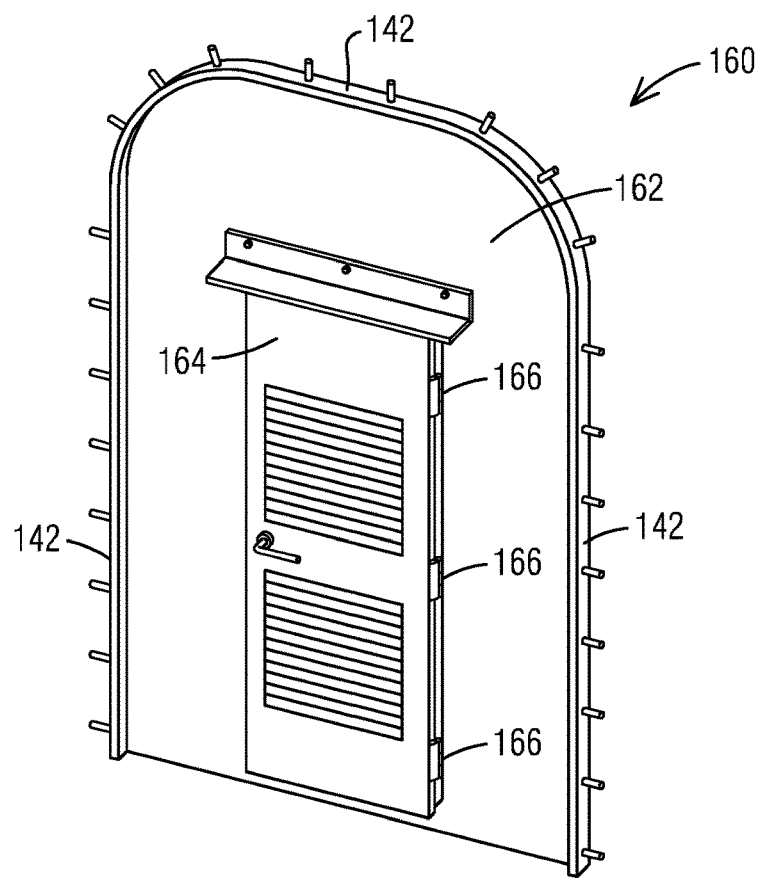
FIG. 4 illustrates a perspective view of an exemplary door that can be fitted within the door opening of FIG. 3.

Door opening 140 may be cast-in-place when plinth 120 is cast with height 134 of plinth 120 being tall enough to accommodate the door opening 140 so that a person and/or equipment can enter and exit into internal cavity 124. Exemplary embodiments for wind turbine towers allow for door opening 140 to be between about 8.0 feet to 20.0 feet tall, or about 10.0 feet to 15.0 feet tall. Similarly, the width of door opening 140 may be between about 2.0 feet to 10.0 feet, or between 3.0 feet to 7.0 feet. These sizes are significantly larger than the size of door openings in prior art towers where the door is formed into a section of the tower itself. The wall thickness 122 of plinth 120 about the door opening 140 may be between about 1.0 foot to 7.0 feet, or between about 2.0 feet to 5.0 feet for example as shown in FIGS. 3 and 4. Alternate embodiments allow for the height and width of door opening 140 to be selected in response to the size of equipment to be moved into and out of internal cavity 124.

For example, if it is desired to cast plinth 120 with a door opening 140 sized to accommodate relatively large equipment, such as a wind turbine power unit, then the height, diameter and wall thickness of plinth 120 must be selected to accommodate the size of door opening 140 while maintaining the ability of plinth 120 to support the weight of equipment tower 100 and receive a tower segment 105 having a desired diameter. Additionally, the height 134 of plinth 120 may be selected to also ensure that a desired equipment elevation of the completed equipment tower 100 or towers is achieved within acceptable tolerances of the site specific parameters.

Referring again to FIG. 3, door opening 140 may be buttressed with reinforcements from steel bars cast into place when plinth 120 is cast. For instance, the steel reinforcements may include a first vertically oriented post 144 on a first side 146 of door opening 140 and a second vertically oriented post 148 on a second side 150 of door opening 140 with posts 144, 148 being substantially parallel. A horizontally oriented cross beam 152 may connect with first and second posts 144, 148 proximate their respective top ends and above door opening 140. A first steel truss 154 may connect cross beam 152 with first post 144 and a second steel truss 156 may connect cross beam 152 with second post 148. The steel reinforcements illustrated in FIG. 3 provide additional support around door opening 140.

FIG. 4 illustrates an exemplary tower entrance assembly 160 that may be affixed within door opening 140 by means of door frame 142, which may be secured to an inside surface of door opening 140 during the casting of plinth 120, or affixed thereto by appropriate means after plinth 120 is cast-in-place. Tower entrance assembly 160 may include an outer door or entrance panel 162 and an inner door assembly 164 that may be connected with entrance panel 162 via hinges 166. As previously described, door opening 140 may be sized so that relatively large equipment may be moved into internal chamber 124 of plinth 120 at any time during or after the construction process of equipment tower 100. Embodiments of the invention allow for entrance panel 162 to be affixed to door frame 142 in a stationary manner after all equipment has been moved into internal chamber 124, which may be toward the end of the construction phase of equipment tower 100. In this respect, once entrance panel 162 is in place, then inner door assembly 164 may be used for human ingress and egress to and from internal chamber 124 to finalize the equipment operations setup and to perform other necessary tasks to make equipment tower 100 operational. Alternate embodiments allow for entrance panel 162 to be connected with door frame 142 using appropriate hinges or tracks (not shown) so that panel 162 may be opened and closed as needed for moving relatively larger equipment into or out of internal chamber 124.

Figure 5:
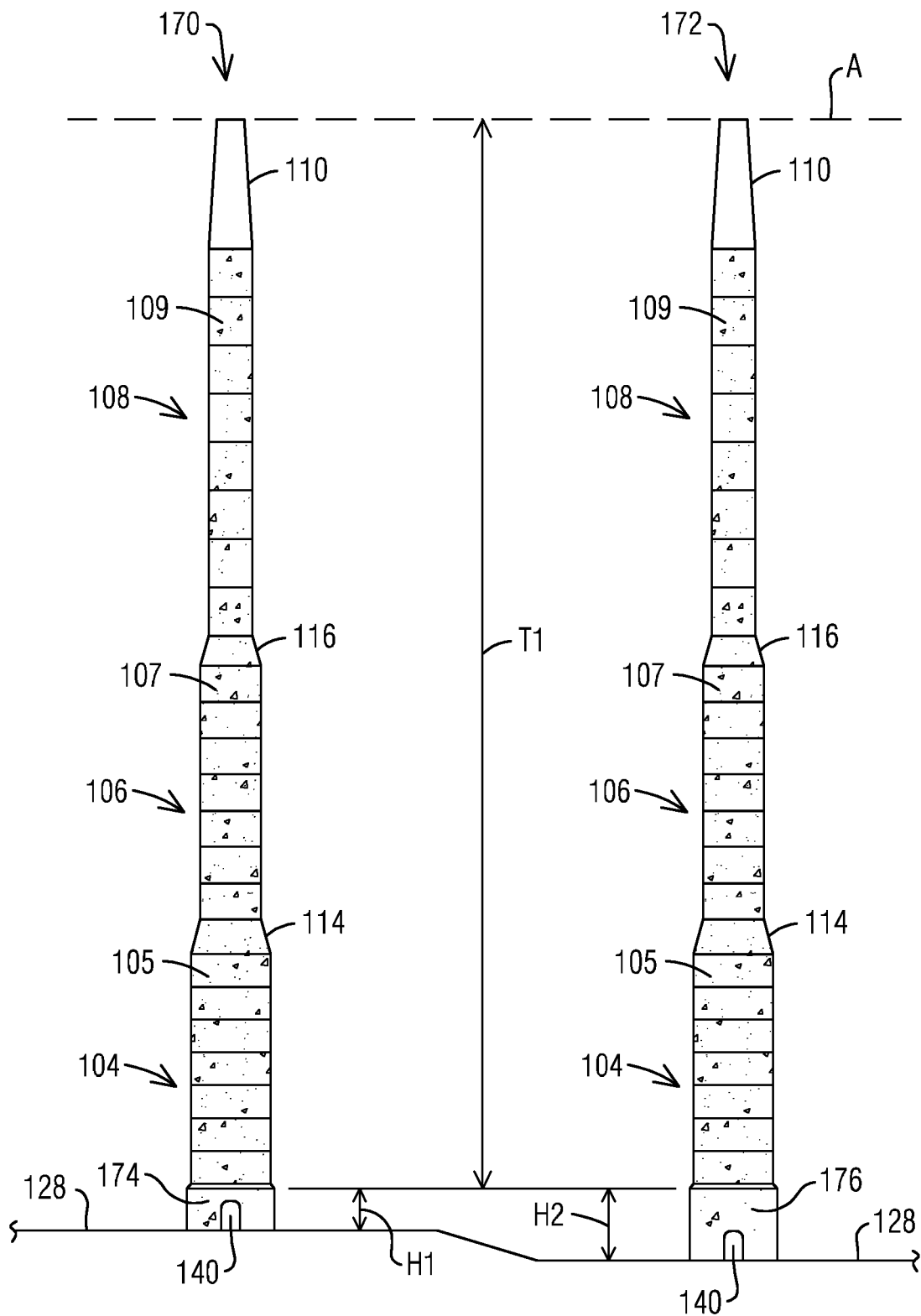
FIG. 5 illustrates two identical equipment towers mounted on plinths of different heights built on land at different elevations in order to achieve the same equipment elevation for both towers.

An advantage of embodiments of the present invention is that the height of plinth 120 may be varied when cast-in-place to achieve an overall desired height or a desired equipment elevation of an equipment tower 100. FIG. 5 illustrates two exemplary equipment towers 170, 172 having different or variable height plinths 174, 176, respectively. The present invention allow for plinths 174, 176 to have different heights based on at least one site specific parameter, such as a foundation elevation, thereby ensuring that equipment attached to respective towers 170, 172 is positioned at a desired elevation upon completion of the towers 170, 172. For example, a site specific parameter may be to position wind turbine equipment at a selected elevation, such as equipment elevation "A", to maximize the wind turbine's ability to utilize wind for power generation as determined by local wind charts and historical climatic data. This elevation "A" may be measured from sea level or another reference level and it may be constant in spite of changes in ground level 128.

During construction of one or more exemplary equipment towers 170, 172 it may be preferable to use the same number and size of tower segments 105, 107, 109 from tower to tower, such as on a wind farm, in order to maximize certain construction and design efficiencies. As shown in FIG. 5, a fixed number and size of tower segments 105, 107, 109 will result in the combined heights of respective tower portions 104, 106, 108 to have a common height "T1", which does not include the heights "H1" and "H2" of respective plinths 174, 176. In this respect, each tower portion 104, 106, 108 will have a fixed height during construction of equipment towers 170, 172. It will be appreciated that adding height "T1" to heights "H1" and "H2" will yield total heights for exemplary towers 170, 172, respectively.

In some situations, site specific topography will require that towers 170, 172 have different total heights, which can be appreciated from FIG. 5. Because it is desirable to use the same design for each tower 170, 172, it is advantageous to vary the heights of respective plinths 174, 176 to achieve placement of tower equipment at elevation "A" when towers 170, 172 are placed on topography 128 having different ground elevations. With the weight of towers 170, 172 and the size of door openings 140 being approximately the same, embodiments of the invention allow for the set of dimensions for plinth 174 to include a height "H1" whereas the set of dimensions for plinth 176 includes height "H2", both of which are established when plinths 174, 176 are cast-in-place. The ability to vary one or more dimensions of plinths 174, 176 based on one or more site specific parameters, such as attaining equipment elevation "A" can provide significant cost and strategic advantages over prior art tower designs.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for maintaining a target elevation of a plurality of wind turbines of a wind farm, the plurality of wind turbines comprising standardized wind turbine tower sections, the method comprising:
    forming a first foundation for a first wind turbine at a first location of the wind farm;
    casting a first plinth in place on the first foundation, wherein the first plinth has a height such that a standardized wind turbine tower section erected on the first plinth reaches the target elevation;
    erecting the standardized wind turbine tower section on the first plinth;
    forming a second foundation for a second wind turbine at a second location of the wind farm;
    determining a difference between a local ground elevation at the first location and the second location;
    calculating a height of a second plinth that is responsive to the difference in the local ground elevation such that a standardized wind turbine tower section erected on the second plinth reaches the target elevation;
    casting the second plinth in place on the second foundation according to the calculated height; and
    erecting the standardized wind turbine tower section on the second plinth.

2. The method of claim 1, wherein the height of the second plinth is increased from a height of the first plinth based on a decrease in the local ground elevation measured between the second foundation and the first foundation.

3. The method of claim 1, wherein the height of the second plinth is decreased from a height of the first plinth based on an increase in the local ground elevation measured between the second foundation and the first foundation.

4. The method of claim 1, further comprising:
    casting an opening within the first plinth, the opening sized to accommodate equipment scheduled for installation in the first wind turbine; and
    casting an opening within the second plinth, the opening sized to accommodate equipment scheduled for installation in the second wind turbine tower.

5. The method of claim 1, wherein the opening within the first plinth and the opening within the second plinth is a door.

6. The method of claim 5, wherein a wall thickness of the first plinth and a wall thickness of the second plinth is selected to accommodate a door opening.

7. The method of claim 1, further comprising:
    installing equipment in the first wind turbine and the second wind turbine tower through the respective opening in the first plinth and the second plinth.

8. The method of claim 1, wherein the first plinth is integrally casted with the first foundation and the second plinth is integrally casted with the second foundation.

* * * * *